Figure 2:
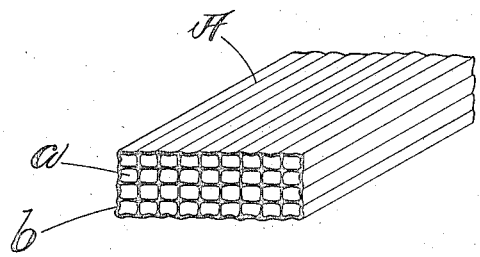

W. B. LASKEY.
CANDY AND PROCESS OF MAKING THE SAME.
APPLICATION FILED APR. 25, 1913.

1,107,325.

Patented Aug. 18, 1914.

Witnesses:
John H. Parker
Alice H. Morrison

Inventor:
William B. Laskey
by Macleod, Calver, Copeland & Dike
Attorneys.

UNITED STATES PATENT OFFICE.

WILLIAM B. LASKEY, OF MARBLEHEAD, MASSACHUSETTS.

CANDY AND PROCESS OF MAKING THE SAME.

1,107,325.   Specification of Letters Patent.   Patented Aug. 18, 1914.

Application filed April 25, 1913.   Serial No. 763,581.

*To all whom it may concern:*

Be it known that I, WILLIAM B. LASKEY, a citizen of the United States, residing at Marblehead, county of Essex, State of Massachusetts, have invented a certain new and useful Improvement in Candy and Processes of Making the Same, of which the following is a specification, reference being had therein to the accompanying drawings.

My invention has for its object a novel piece of candy and the process of making the same.

Heretofore in the manufacture of candy, stick candy has been produced which has been rendered porous by wrapping a mass of warm pulled candy around a stick, removing the stick, pinching together the ends of the mass of candy to close the ends of the passage left by the withdrawal of the stick, and then repeatedly doubling the candy and pulling it by hand, or over a hook in the well known manner. There has resulted from this process a piece of candy having irregularly arranged holes extending for varying distances lengthwise of the stick, but the said holes or pores have not been arranged in any predetermined pattern and their cross sectional area has borne relatively small proportion to the cross sectional area of the piece of candy.

Porous candy is particularly desirable in the trade because of its large bulk in comparison to its weight, and also because it has a sweeter taste than dense candy owing to the fact that it dissolves more rapidly.

The piece of candy embodying my present invention is provided with a series of holes or passages running lengthwise of the strand of candy as it is formed, the holes being arranged in a predetermined pattern and the walls separating the holes or passages being very thin. The total cross-sectional area of the walls is very small compared with the corresponding area of the holes, so that the bulk of the candy in proportion to its weight is very large indeed.

The piece of candy embodying my invention is particularly adapted for use as stick candy or for use as a center for chocolates, *i. e.* to be cut into short pieces and coated with chocolate or other material. The passages in the piece may also be filled with a filling, which is fluid or semi-fluid at the time that it is introduced into the passages.

The process of making my improved candy is believed to be novel but was described in my application for United States Letters Patent filed February 6, 1913, Serial No. 746,485, but was not claimed therein, as said application covers the machine capable of performing the process claimed herein.

The invention will be fully understood by reference to the following specification taken in connection with the accompanying drawings, and the novel features thereof are pointed out and clearly defined in the claims at the close of this specification.

Figure 1:
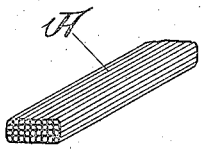
Figure 4:
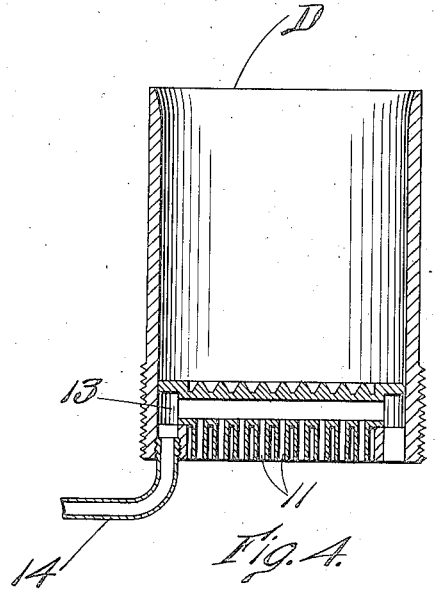
Figure 3:
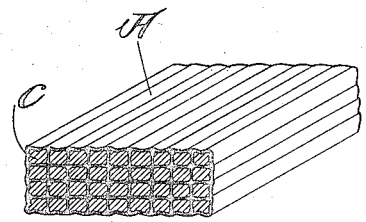
Figure 5:
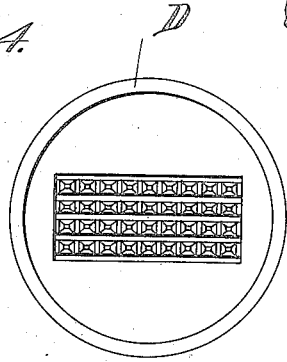

Referring to the drawings, Figure 1 is a perspective of a piece of candy embodying the invention. Fig. 2 is a view in perspective of the candy as it comes from the die and before it has been pulled down to the size shown in Fig. 1. Fig. 3 shows a piece of candy formed as described herein having the passages filled with some suitable filling material. Fig. 4 is a section of a die by means of which the pieces of candy shown and described herein are formed. Fig. 5 is a plan view of the die shown in Fig. 4.

Referring to the drawings, and particularly to Figs. 1 and 2 a piece of candy embodying my invention is indicated at A. It contains a series of parallel passages *a* separated from each other by thin walls *b* of candy. The passages extend continuously from one edge of the piece to the other and they may be of any desired cross section but I prefer to make them polygonal and, of the various polygonal shapes, I prefer the rectangular, so that the sides of the passages may be placed parallel to each other and the dividing walls *b* may be made as thin as possible. The candy is formed by being forced through a die such as is shown in Figs. 4 and 5, provided with tubular hole-forming members 11, each corresponding in size and shape to a passage in the piece of candy. The candy may then be stretched out or pulled down to any desired size, as for instance as shown in Fig. 1. This does not affect the structure of the candy, but reduces the thickness of the walls and the size of the passages proportionally. By this means, a piece of candy may be produced which while having the structure shown and described will be so delicate and frail that it will melt almost instantly in the mouth. The amount which the candy is pulled out if at all will be determined by the composition of the candy and the subsequent use to which it is to be put.

The candy which is put through the die to form the piece embodying my invention may be either pulled candy or other suitable candy, ordinarily hard boiled. If desired a filling material, such for instance as a cream or paste, or peanut butter may be introduced into the passages through the hollow passage-forming members 11 of the die, and the chamber 13 and pipe 14. Any suitable fluid or semi-fluid filling material may be used. A piece of candy embodying this modification is indicated at $c$. The proportion of candy composing the walls of the piece to the filling material contained in the passages, may, if desired, be relatively small so that while finished piece will retain its shape perfectly, when eaten it appears composed of semi-fluid material.

The piece of candy embodying my invention may be coated with chocolate or other coatings in the well known manner, or may be formed into sticks or chips.

While it is not necessary to pull the candy after it emerges from the die D, it is desirable to do so, because the surface of the candy on passing through the die receivers a glazed or vitreous appearance, but lacks luster or sheen which is highly desirable in candy. This luster or sheen is immediately produced on the surface of the candy, if the candy is stretched or pulled even to a slight degree.

The die shown in Figs. 4 and 5 hereof is believed to be of novel and patentable structure, and the right is reserved to make application as provided by law for Letters Patent of the United States covering the said die.

What I claim is;

1. As a new article of manufacture, a piece of candy having uninterrupted parallel passages extending from one edge to the other of the piece of candy, said passages being arranged to form a predetermined pattern.

2. As a new article of manufacture, a piece of candy having uninterrupted parallel passages extending from one edge to the other of the piece, said passages being polygonal in cross section and arranged in predetermined pattern with their adjacent sides parallel.

3. As a new article of manufacture a piece of candy composed of a shell surrounding a plurality of uninterrupted parallel passages extending from one edge of the piece to the other, said passages containing filling material.

4. The process of making porous candy which consists in forcing candy through a die provided with hole-forming members to form a strand of candy having relatively large passages extending lengthwise thereof, and then stretching the candy to reduce the cross-sectional area thereof.

In testimony whereof I affix my signature, in presence of two witnesses.

WILLIAM B. LASKEY.

Witnesses:
GEORGE P. DIKE,
ALICE H. MORRISON.